US005623567A

United States Patent [19]
Barberio et al.

[11] Patent Number: 5,623,567
[45] Date of Patent: Apr. 22, 1997

[54] METHOD FOR MAKING AN EVANESCENT FIELD COUPLER

[75] Inventors: Yvonne L. Barberio, Neshanic; Donald W. Dahringer, Glen Ridge; Jon W. Engelberth, Denville; Arthur E. Neeves, Morristown, all of N.J.

[73] Assignee: Lucent Technologies Inc., Murray Hill, N.J.

[21] Appl. No.: 632,283

[22] Filed: Apr. 15, 1996

Related U.S. Application Data

[63] Continuation of Ser. No. 366,931, Dec. 30, 1994, abandoned.

[51] Int. Cl.$^6$ ..................................................... G02B 6/245
[52] U.S. Cl. ............................... 385/30; 356/73.1; 385/24
[58] Field of Search ................................. 385/15, 24, 25, 385/27, 28, 30, 39, 42, 50, 123–127; 356/73.1

[56] References Cited

U.S. PATENT DOCUMENTS

| | | | |
|---|---|---|---|
| 4,493,528 | 1/1985 | Shaw et al. | 385/30 |
| 4,536,058 | 8/1985 | Shaw et al. | 385/30 |
| 4,630,884 | 12/1986 | Jublinski | 385/30 X |
| 4,688,882 | 8/1987 | Failes | 385/30 |
| 4,778,237 | 10/1988 | Sorin et al. | 385/30 X |
| 4,930,863 | 6/1990 | Croitoriu et al. | 385/125 |
| 5,042,896 | 8/1991 | Dahlgren | 385/31 |
| 5,136,818 | 8/1992 | Bramson | 356/73.1 X |

OTHER PUBLICATIONS

M.J.F. Digonnet et al., "Analysis of a Tunable Single Mode Optical Fiber Coupler," *IEEE Journal of Quantum Electronics*, vol. QE–18, No. 4, pp. 746–754, Apr. 1982.

O.G. Leminger et al., "Determination of Single–Mode Fiber Coupler Design Parameters from Loss Measurements," *Journal of Lightwave Technology*, vol. LT–3, No. 4, pp. 864–867, Aug. 1985.

H. Berthou et al., "Switching Characteristics of a Piezoelectrical Actuated Evanescent–Wave Directional Coupler," *Electronic Letters*, vol. 23, No. 9, pp. 469–470, Apr. 23, 1987.

A.K. Das et al., "Analysis and Modelling of Low–Loss Fused Fiber Couplers," *SPIE Components for Fiber Optic Applications V*, vol. 1365, pp. 74–85, 1990. [No Month].

A.K. Das et al., "Automatic Determination of the Remaining Cladding Thickness of a Single–Mode Fiber Half–Coupler," *Optics Letters*, vol. 19, No. 6, pp. 384–386, Mar. 14, 1994.

*Primary Examiner*—John D. Lee

[57] ABSTRACT

A method for preparing optical fibers for an evanescent field coupler by forming a groove along a top surface of a substrate block, wherein the groove is formed shallower than the diameter of a stripped fiber. An optical fiber is positioned in the groove, wherein a center portion of the optical fiber is stripped of its coating. The optical fiber is glued in the groove, then polished to remove a portion of its cladding to form a coupling region, while not polishing the top surface of the substrate block. An optical signal is applied to an end of the optical fiber while loss of the optical signal is measured at the coupling region. Polishing and monitoring are repeated until a desired loss value is reached. The coupler can be added to an operating optical communication system.

14 Claims, 12 Drawing Sheets

METHOD FOR MAKING AN EVANESCENT FIELD COUPLER

This is a continuation of application Ser. No. 08/366,931 filed Dec. 30, 1994 abandoned.

BACKGROUND OF THE INVENTION

1. Field of the Invention

The field of the invention relates to optical communications systems, and more particularly, to a method for making an evanescent field coupler.

2. Related Art

Evanescent field coupling occurs when two single-mode fibers, for example, are placed parallel to one another and the distance between the core of the fibers is reduced until the evanescent fields of the two guides overlap. The fundamental mode on one fiber interacts with the fundamental mode of the neighboring fiber and power is coupled between the two fiber cores. The strength of the coupling is determined by the separation of the fiber cores, the extent to which the evanescent field spreads into the cladding, and the length of the coupling region.

A cross-sectional view of a conventional evanescent field coupler (EFC) is shown in FIG. 1. Two optical fibers 102 and 104 are mounted in substrate blocks 106 and 108, respectively, such that the cores 110 and 112, respectively, of the two fibers are in close proximity to each other permitting coupling as described above. Each fiber/substrate block is referred to as a "half" of the coupler.

Two common EFC's are shown in FIGS. 1 and 2. FIG. 1 shows a cross section of a laterally switched coupler 100. According to this technique, coupling is switched on and off by lateral separation of the fiber cores. FIG. 2 shows a cross section of a vertically switched coupler 200. According to this technique, coupling is switched on and off by vertical separation of the fiber cores. See M. Digonnet et al., "Analysis of a Tunable Single Mode Optical Fiber Coupler," *IEEE of Quantum Electronics*, Vol. QE-18, No. 4, pp. 746–751 (Apr. 1982), and H. Berthou et al., "Switching Characteristics of a Piezoelectrical Actuated Evanescent-Wave Directional Coupler," in *Electronic Letters*, Vol. 23, No. 9, pp. 469–471 (Apr. 23, 1987), for examples of a sliding EFC and a vertical switching EFC, respectively.

EFC's, such as the one exemplified in FIG. 1, are typically made by gluing each fiber in a grooved glass substrate block, or a material of like hardness. FIG. 3 shows a cross section of such a mounting arrangement. A mounted fiber 302 and its corresponding substrate block (hereafter called the "block") 304 are ground to remove a predetermined amount of outer cladding material for a desired amount of evanescent coupling when properly aligned with another coupler half.

Evanescent field coupling theory is well understood (see, for example, articles by: A. Das et al., "Automatic Determination of the Remaining Cladding Thickness of a Single-Mode Fiber Half-Coupler," *Optics Letters*, Vol. 19, No. 6, pp. 384–386 (Mar. 15, 1994); A. Das & M. Pandit, "Analysis and Modeling of Low-Loss Fused Fiber Couplers," SHIE, Vol. 1365; "Components of Fiber Optic Applications," Vol. pp. 74–85 (1990); and O. Leminger et at., Determination of Single-Mode Fiber Coupler Design Parameters from Loss Measurements," *Journal of Light Wave Technology*, Vol. LT-3, No. 4, pp. 864–867 (Aug. 1985)). Polish depth, fiber bend radii, index of refraction of the fibers, refractive index of coupling liquid glue and block material hardness, index profiles of the fiber cores, and the like, are parameters that affect performance of an EFC. Conventional manufacturing techniques, however, have several drawbacks.

To date, couplers are limited to original designs. That is to say, EFC-type couplers can not be added to an optical communications system in the field during operation. Entire subsystems and/or switching networks must be shut down for new EFC's switches to be added.

Another drawback of conventional couplers/switches is their performance. Switching repeatability is poor, maintaining a coupling ratio requires frequent adjustment and fiber types need to be closely matched. Additionally, for lateral switching couplers, scratching during lateral movement can reduce the lifetime of the coupler by inducing failure through static fatigue. High optical loss during manufacture is still another disadvantage of conventional EFC devices.

SUMMARY OF THE INVENTION

The present invention is directed to a method for making an evanescent field coupler (EFC) with a loss limited design.

The method for fabricating an EFC according to the present invention greatly reduces the time for polishing of the fiber. A new groove geometry and mounting technique for assembling fibers in the coupler halves permits the coupling section of each fiber to be positioned above the top surface of its corresponding substrate block, thus exposing the fiber for polishing without the need to simultaneously polish the substrate block as in prior art polishing techniques. Additionally, monitoring of optical signal loss during the polishing process yields extremely accurate polishing depth.

The method for manufacturing permits the EFC of the present invention to have highly repeatable and accurate on/off switching by separation of the coupler halves. Switching rates up to 10 msec (milliseconds per switching cycle) are achieved by the invention. Additionally, the present invention permits "un-matched" optical fibers to be coupled and switched, which is a departure from the prior art.

EFC's according to the present invention can be fabricated during operation of an optical communications system. Such in-operation fabrication eliminates shut down of the system to add a coupler/switch to existing fibers, to add new fibers to the network, or to replace an existing coupler/switch.

BRIEF DESCRIPTION OF THE FIGURES

The invention will be better understood if reference is made to the accompanying drawings in which.

DETAILED DESCRIPTION OF THE PREFERRED EMBODIMENT

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

Terms

This section describes several terms used throughout the specification and claims to facilitate discussion of the invention.

The term "optical fiber " is commonly referred to in the art as a fiber optic light guide or simply a fiber. There are two main categories of optical fibers: single-mode fibers and multi-mode fibers. The present invention focuses on single-mode fibers, such as the Corning DS (dispersion shifted) or MC (matched clad) fiber, the AT&T DS or DC (depressed clad) fiber, and Sumitomo SC (silica core) which are common and commercially available fibers or the specific fibers listed above. Implementation of the present invention, however, is not limited to single-mode fibers. The present invention also permits optical fibers with "un-matched" specifications to be coupled and switched, which is a departure from the prior art. (I.e., coupling of a Corning DS fiber and an AT&T DC fiber.)

The term "substrate block" or simply "block" will be used throughout this discussion to refer to either of the two halves of an EFC coupler. Each block is used to support an optical fiber. The blocks are typically formed of a silicon dioxide, also called silica or quartz. Other materials having similar hardness may be substituted as would be apparent by a person skilled in the relevant art.

The term "optical communication system " will be generally referred to as system. A system can include one or more optical fiber switches and/or networks of such switches, or the like, as would also be apparent to a person skilled in the relevant art.

The terms "vertical positioning" and "lateral positioning" are also referred to in this description. The term "vertical positioning" is most commonly used to mean on/off switching by translational displacement between the two halves of the coupler relative displacement perpendicular to polished mating block surfaces. The term "lateral positioning" means adjustment of the fiber coupling (i.e., coupling ratio) by translation or rotational movement of the coupler halves with respect to an axis perpendicular to the length of the fibers.

Further terms will be described throughout the following discussion of the invention.

The EFC Coupler Halves and Compliant Mount

The preferred embodiment of the invention is now described with reference to the figures where like reference numbers indicate identical or functionally similar elements. Also in the figures, the left most digit of each reference number corresponds to the figure in which the reference number is first used.

Figure 1:
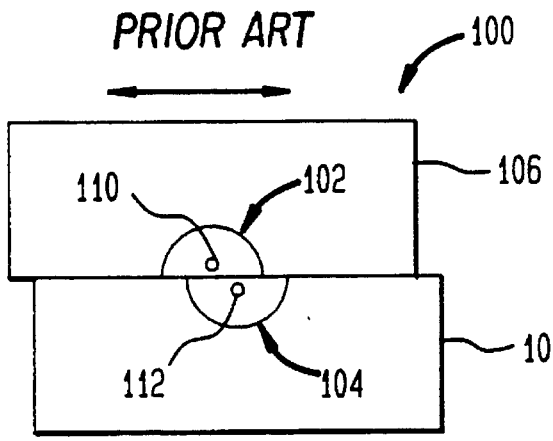
FIG. 1 shows an evanescent field coupler (EFC) representing a lateral switching technique.
Figure 2:
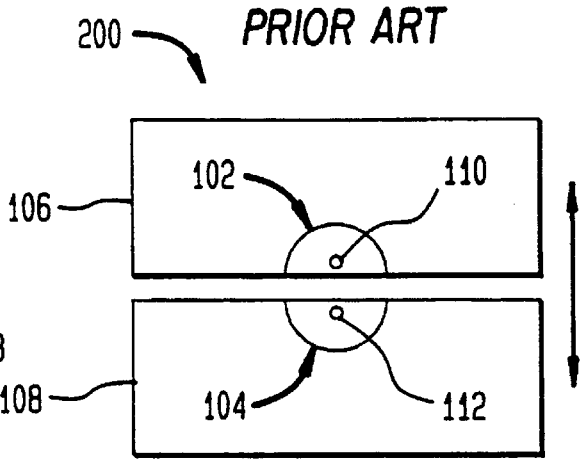
FIG. 2 shows an EFC showing a vertical separation switching technique.
Figure 3:
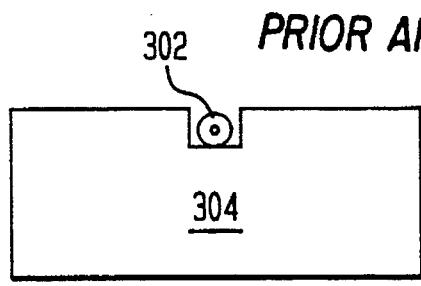
FIG. 3 shows a cross-section of a optical fiber positioned in a substrate block.
Figure 4:
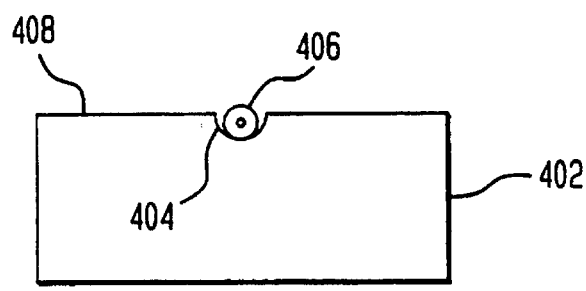
FIG. 4 shows cross-section of an optical fiber positioned in a substrate block according to the present invention.

FIG. 4 shows a cross-section of a grooved, substrate block 402, which is a single half of an evanescent field coupler (EFC) according to the present invention. Block 402 has a groove 404 in which an optical fiber 406 is positioned. The depth of the groove 404 is shallow enough to permit a predetermined amount of fiber 406 to extend above a top surface 408 of block 402.

The positioning of the fiber 406 in this manner expedites the polishing process according to the invention, as described in detail below. The specific geometry of the groove is described further below in connection with FIGS. 6A–6E.

Figure 5:
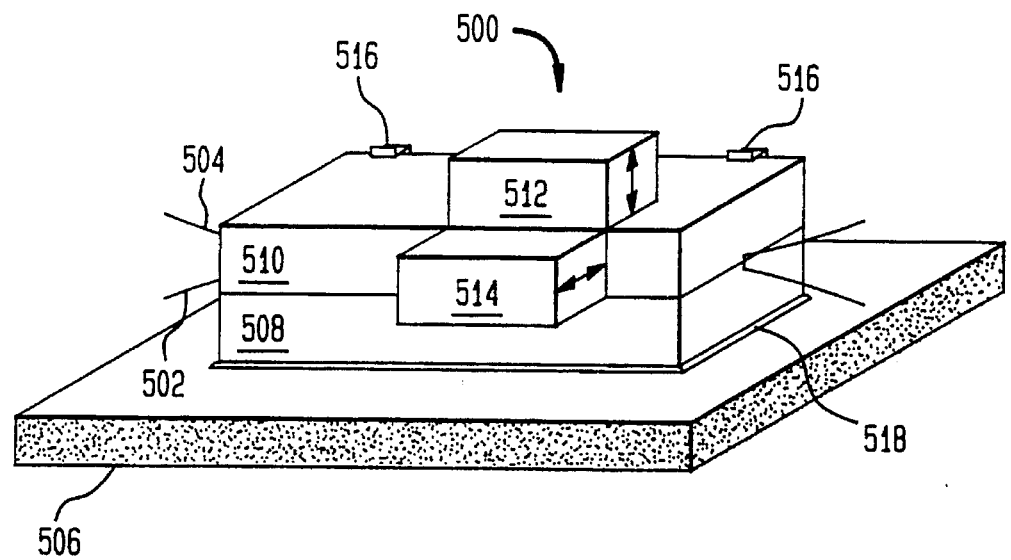
FIG. 5 shows an EFC with a compliant mount according to the present invention.

Two coupler halves that are similar to the coupler half shown on FIG. 4 are prepared and polished, as described below, to form an EFC 500 shown on FIG. 5. Thus; FIG. 5 is a schematic representation of the EFC 500 according to the invention.

The structure and method of the present invention has the significant advantage of permitting an EFC to be added to an operational communication system. Accordingly, new fibers can be coupled into the system, new switches can be added, or switches can be replaced. The main advantage yielded by the invention is that the system need not be shut down during installation of an EFC according to the invention.

The EFC 500 is used to couple and switch two optical fibers 502 and 504. In this embodiment, the optical fiber 502 is part of an operational optical communication system. The optical fiber 504 may also be a part of the system, or may be a new fiber to be added to the system. As would be apparent to the persons skilled in the relevant art, the EFC of the invention need not be limited to integration into an operating optical system, but may be installed in a new system, or simply be used with two fibers in a variety of different configurations apart from an optical communication system.

The EFC 500 comprises a housing structure 506 for supporting two coupler halves 508 and 5 10. Both coupler halves 508 and 510 are substrate blocks formed of silica. In the present embodiment, block 508 has a groove (not shown) that supports fiber 502, and block 510 has a groove (not shown) to support the second fiber 504.

The EFC 500 of the present invention achieves on/off switching of optical signals between the two fibers 502 and 504 by vertical separation of blocks 508 and 510. A means for implementing the vertical separation is shown generally at 512. In a preferred embodiment of the present invention, the vertical positioning means 512 is implemented with a linear actuator (such as a DC Encoder Mike™ Micropositioning Controller, Model No. 18093, manufactured by ORIEL, Stratford, Conn.). Other devices, such as piezoelectric stacks, can also be used.

The EFC 500 also comprises lateral positioning means 514 for adjusting the coupling ratio between the fibers 502 and 504. The linear positioning means 514 can also be implemented with a linear actuator, as described above. However, the vertical positioning means 512 and the lateral positioning means 514 need not be implemented using the same type of linear actuators.

The EFC 500 also comprises structural supports 516. Structural supports 516 are idealized for generality. Many different structural support configurations would become apparent to a person skilled in the relevant art. No supporting structure has been shown for positioning means 512 and 514, in order to simplify the drawing.

The EFC 500 also comprises compliant mounting means 518 for elastically securing the block 508 to the housing 506. The compliant mounting means 518 is approximately 100–500 μm thick and is compressible to permit angular self-alignment between blocks 510 and 508 (and allows minor vertical displacement of block 508) during on/off switching of the coupler 500. The compliant mounting means 518 can therefore be thought of as a micro-shock absorber, which is very rigid in the plane of polished surface, but allows limited rotation and displacement perpendicular to the polished surface. This results in "perfect" repeatable alignment. Immobile fastening of the block 508 to the housing 506, as in prior art EFCs, is undesirable. Thus, the compliant mounting means 518 should not undergo plastic deformation, nor should it be rigid. The compliant mounting means 518 is important to prevent switching forces, environmental effects, etc., from misaligning the blocks and thus causing undesirable changes in coupling ratio. As a result, the compliant mounting means 518 facilitates consistent on/off switching of the coupler through many switching cycles, while maintaining a desired coupling ratio between the fibers 502 and 504. Such accurate, repeatable switching cannot be achieved by conventional EFC's.

According to a preferred embodiment of the present invention, the compliant mounting means 518 comprises a double-sided adhesive tape, such as Scotch Double Stick tape, Catalog No. 137, manufactured by 3M Corporation, St. Paul, Minn. Other materials having similar elastic adhesive properties can be used.

The Block Groove

Another important aspect of the present invention is the proper positioning and alignment of the fibers 502 and 504 in their respective blocks 508 and 510. Each block 508 and 510 must be properly machined so that the fibers can be polished in an efficient manner. FIGS. 6A–6E show an exemplary coupler half 600 in connection with the present invention. Blocks 508 and 510 of FIG. 5 are implemented using a block such as block 600.

Figure 6A:
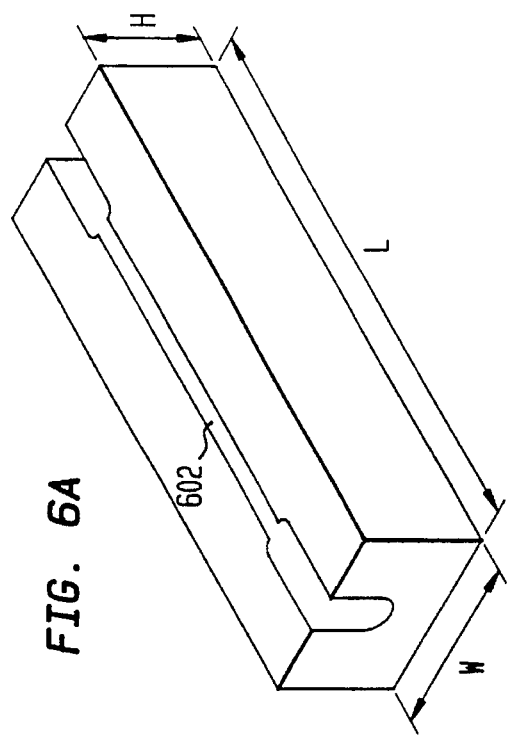
FIG. 6A shows a perspective view showing a grooved substrate block according to the present invention.
Figure 6E:
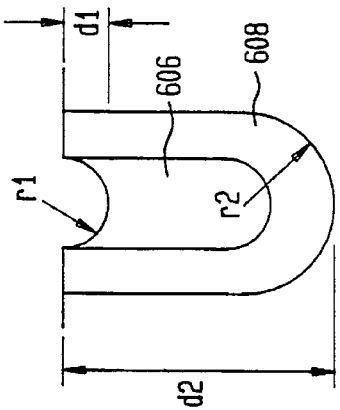
FIG. 6E shows an expanded view of the groove in FIG. 6D.
Figure 6D:
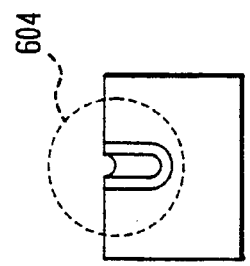
FIG. 6D shows an end view of the grooved substrate block of FIG. 6A.
Figure 6B:
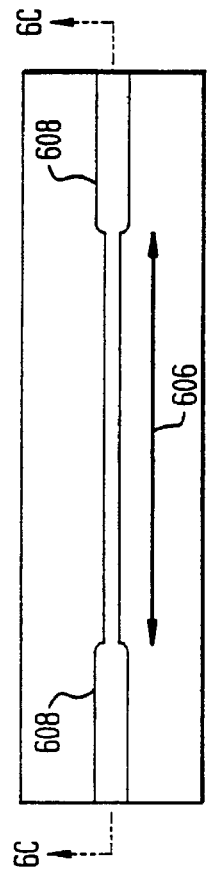
FIG. 6B shows a top view of the grooved substrate block of FIG. 6A.
Figure 6C:
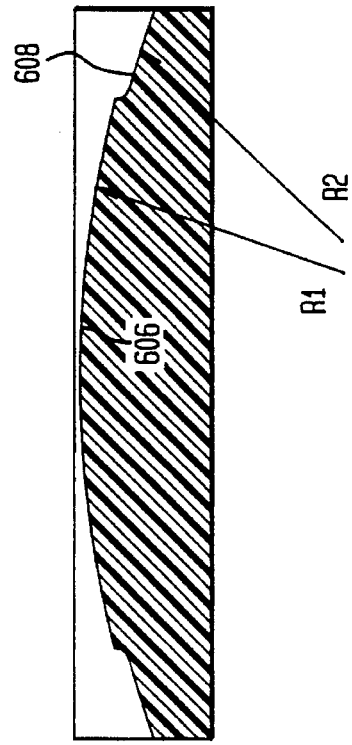
FIG. 6C shows a side, cross-sectional view of the grooved substrate block of FIG. 6A.

The block 600 comprises silicon dioxide (i.e., silica or quartz) having an overall length of approximately 20 mm, a width of approximately 3mm, and a height of approximately 2 mm. FIG. 6A is a perspective view of block 600. FIG. 6B shows a top view of the block 600. FIG. 6C is a cross-sectional side view of block 600 through line CC in FIG. 6B. FIG. 6D is an end-view of block 600. An expanded view 604 of groove 602 at the end of block 600 is shown in FIG. 6E.

Groove 602 is formed shallow in the center portion of block 600 to permit the fiber cladding to extend above the top surface of the block. As noted above, this more easily facilitates accurate and fast polishing of the fiber. Given the standard fiber diameter of 0.125 mm, the preferred depth ($d_1$) of groove 602 at the center of the block is approximately 0.070 mm. The depth of groove 602 becomes greater toward each end of the block.

The depth profile for groove 602 is shown in FIGS. 6B and 6C. The center 12 mm of groove 602 (see section 606) follow a first radius of curvature as shown at R1 in FIG. 6C, which is approximately 100.0000 mm radius. Both end sections 608 of the groove have a larger depth profile than the center section 606. The end sections 608 have a radius of curvature R2, which is approximately 99.825 mm. Based on radius R2, the depth ($d_2$) at each end of the block 600 is approximately 1 mm. As shown in FIG. 6E, the radius of curvature (r1) at region 606 has a radius of curvature of 0.080 mm. The profile (r2) for groove 602 at sections 608 has a radius of curvature of 0.250 mm. Thus, the width of groove 602 at region 606 is approximately 0.160 mm, and its width at regions 608 is approximately 0.5 mm.

As will be discussed below, a length of approximately 13–15 mm of fiber coating should be removed before the fiber is positioned and glued to the block 600. Thus, section 606 of groove 602 will accommodate the stripped section of the fiber, and regions 608 will accommodate the unstripped portions. Once the fiber is glued in position, this groove profile provides stability at the ends of the groove to prevent breakage of the fiber.

Various methods for machining the groove 602 in block 600 would be apparent to a person skilled in the relevant art. The above exemplary values for various dimensions have been given by way of example, not limitation.

Figure 7:
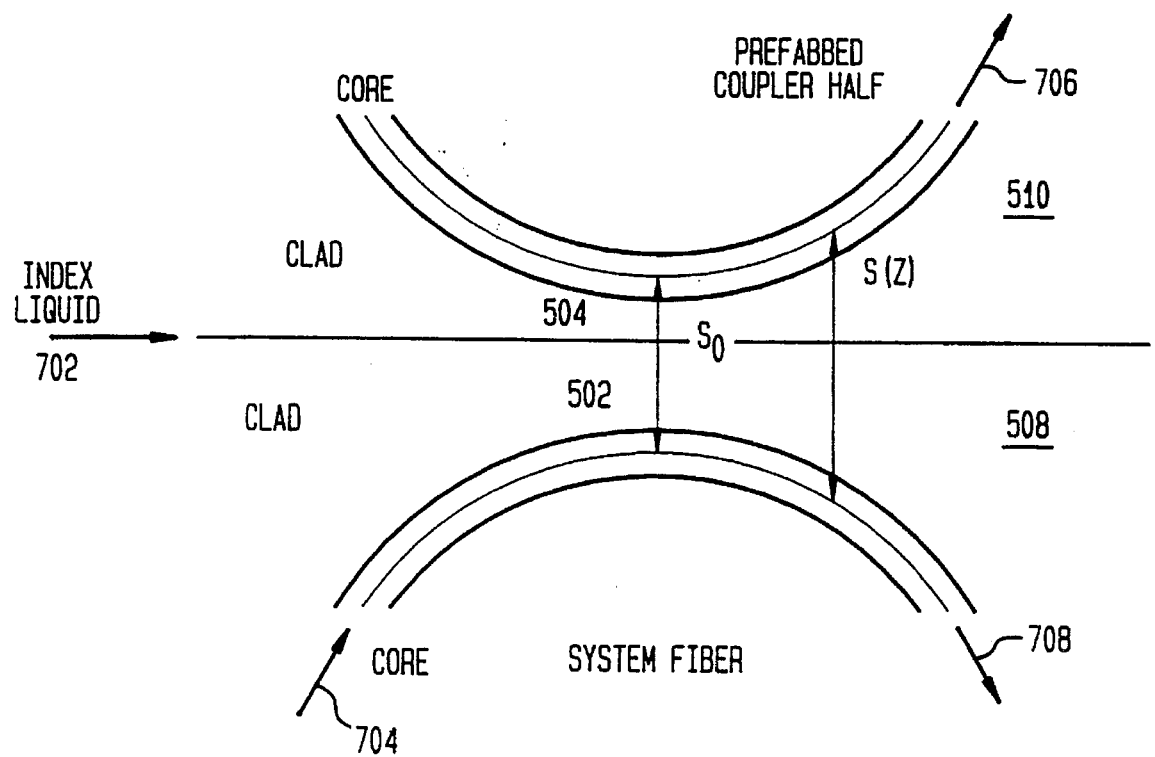
FIG. 7 shows an idealized cross-sectional view of evanescent coupling between a coupler half and a system fiber half of an EFC according to the present invention.

FIG. 7 shows an idealized cross-sectional view of evanescent coupling between a pair of polished, coupled optical fibers according to the present invention. The system fiber half, including fiber 502 and block 508 are shown on the bottom of the figure, and the second coupler half, comprising block 510 and fiber 504 are shown on the top. Also shown in FIG. 7 is a coupling liquid 702, having a refractive index of n=1.452. An optical signal 704 is shown entering the core of fiber 502. As a result of evanescent coupling between fibers 502 and 504, a portion of the optical signal 704 is shown exiting both fibers at 706 and 708, respectively. The core separations $S_0$ and the lateral displacement (perpendicular to the plane of the paper) are the main parameters affecting the coupling ratio.

Figure 8:
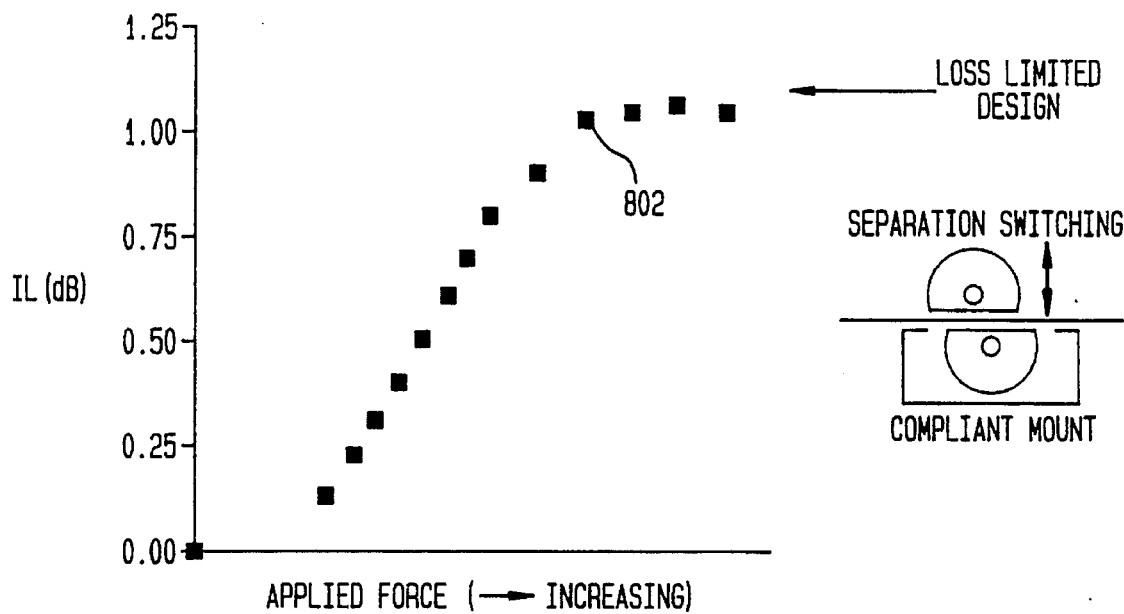
FIG. 8 is a graph showing experimental results of induced loss versus applied force of a coupler according to the present invention.

FIG. 8 is a graph of experimental data showing induced loss (measured in decibels (dB)) on the ordinate, versus applied force (separation distance between the two cores), on the abscissa. The loss in dBs is normalized, where 0 represents no loss from the system fiber, and 1 represents the maximum loss (this provides efficient, loss-limited design).

Figure 9:
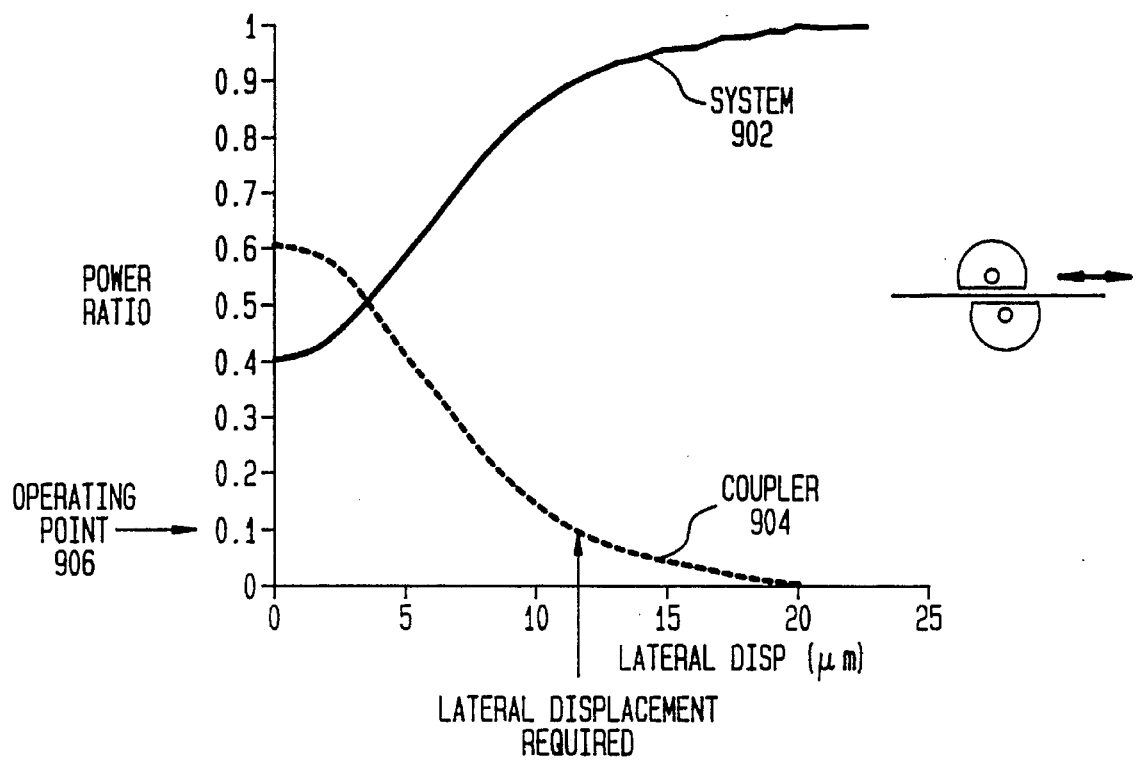
FIG. 9 shows a theoretical graph of lateral displacement adjustment in accordance with the present invention.

FIG. 9 shows a theoretical graph of lateral displacement adjustment. Coupling power ratio is shown normalized on the ordinate, versus lateral displacement of the fiber cores (in μm's) on the abscissa. A solid curve 902 represents the power of an optical signal in the system fiber, and curve 904 represents the power of the signal coupled to the system fiber. An example operating point for 10% coupling is shown generally at 906, and corresponds to a lateral displacement of approximately 11 μm, for example.

Polishing and Assembly

Figure 10:
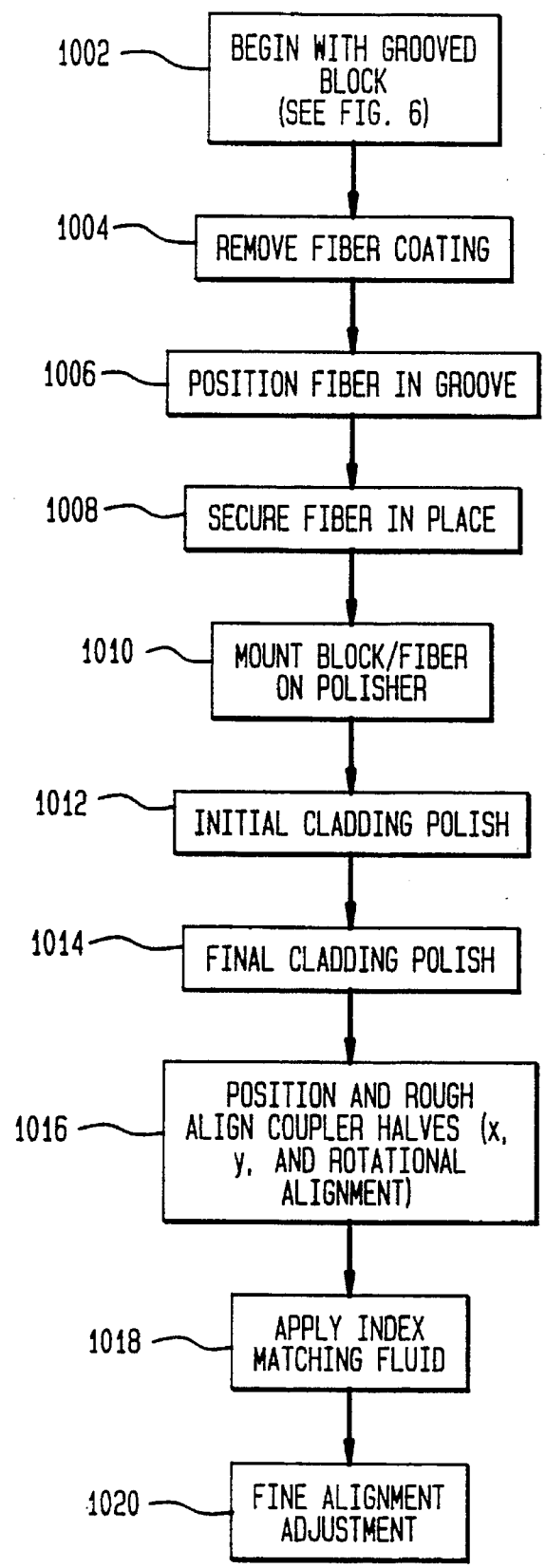
FIGS. 10–16 are flowcharts of a method for manufacturing an EFC according to the present invention.

FIGS. 10–15 will now be described in connection with fiber optic polishing and assembly of an EFC coupler in connection with the present invention. FIG. 10 is a representative, high-level block diagram of the polishing and assembly operations. First, a grooved block is prepared according to the above description at FIGS. 6A–6E, as shown at a step 1002. A suitable fiber is selected, and its coating is removed in accordance with conventional techniques, as shown at a step 1004. (A conventional acid bath can be used for removing of the coating.) As discussed above, a section of about 13–15 mm long is removed from the area of the fiber to form a coupling section (the coupling "region" is polished). The stripped fiber is then positioned in the groove (see step 1006). The stripped section of the fiber will self-align in the center section 606 of the groove 602. The fiber is then secured in place (see step 1008).

The block with attached fiber is then mounted on a polisher (see step 1010). In contrast to conventional polishing of mounted fibers, only cladding of the mounted fiber is removed during an initial and final cladding polish, as shown at steps 1012 and 1014. This accelerates the polishing step and makes inspection of the polished fiber much easier.

The assembly of two coupler halves begins at a step 1016. Both coupler halves are (separately) positioned and roughly aligned in the x and y direction as well as rotationally. An index-matching fluid is applied at a step 1018 prior to final alignment and adjustment of the coupler at a step 1020.

Further detail of steps 1006, 1008, 1010, 1012, 1014, and 1020 are shown in FIGS. 11–16, respectively.

Figure 11:
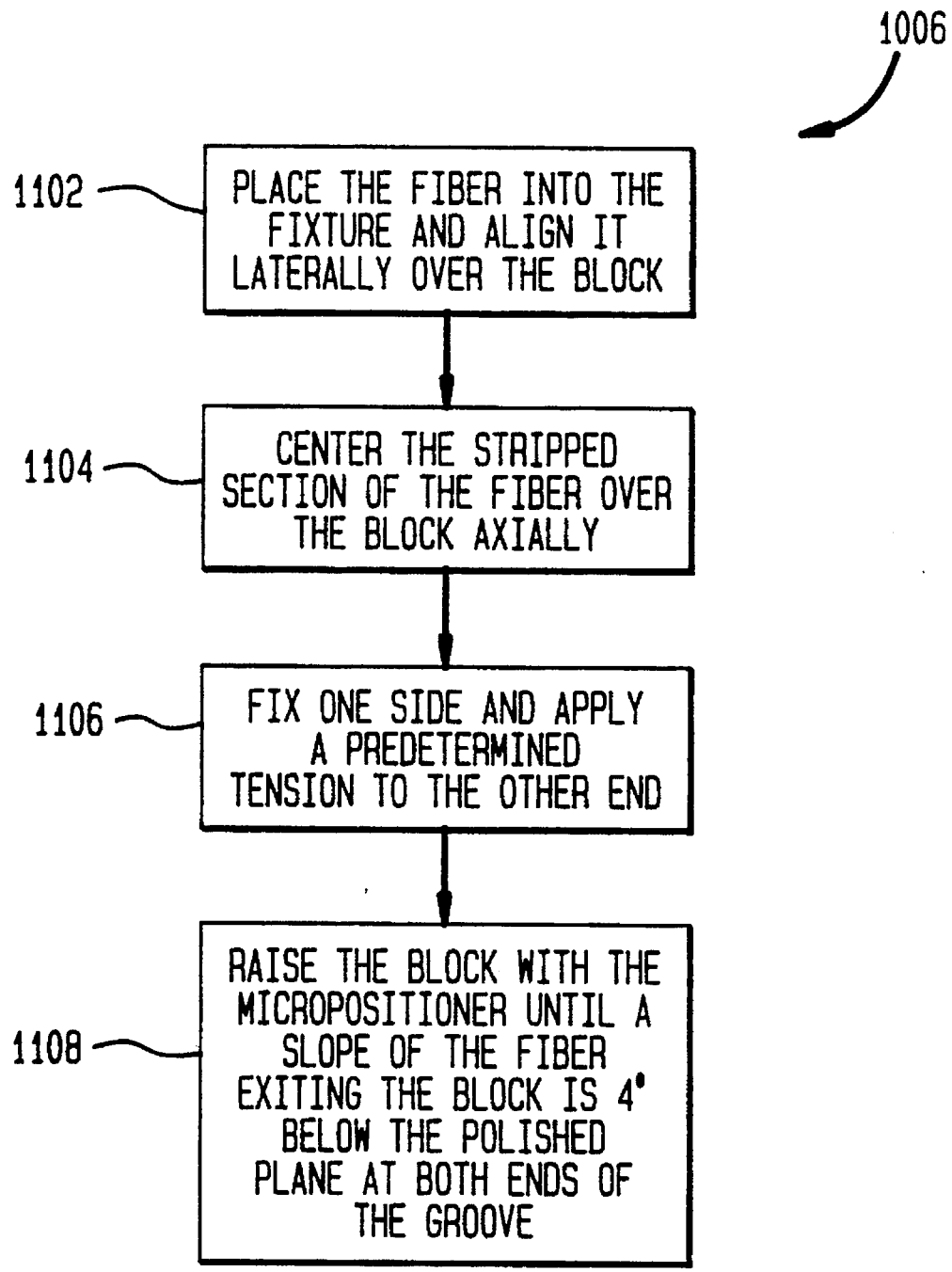
Figure 12:
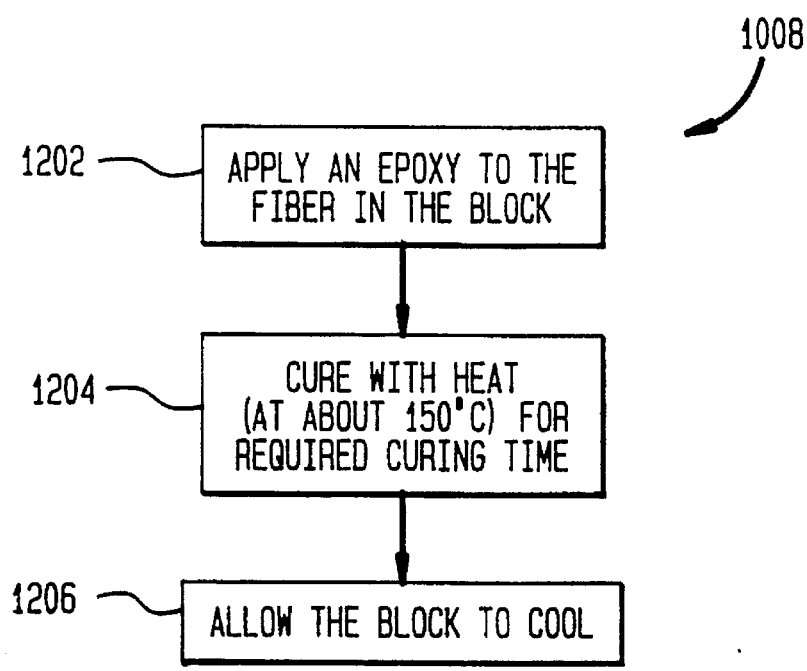
Figure 13:
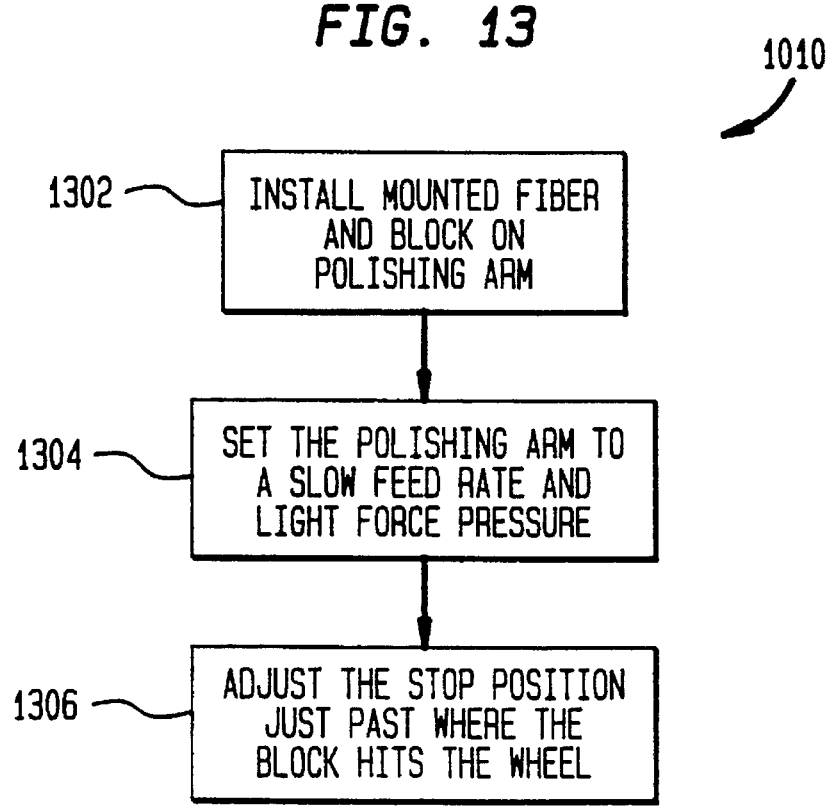

As shown in FIG. 11, step 1006 comprises four steps 1102, 1104, 1106 and 1108. At a step 1102, the fiber is placed in the fixture and the fiber laterally aligned over the block. The stripped section of the fiber must be centered axially over the block, as shown at step 1104. One side of the block and fiber must be temporarily fixed and a predetermined tension applied to the other end of the fiber, as shown at step 1006. The block must then be raised with a micro-positioner until a slope of approximately four degrees is achieved, as shown generally at step 1108. Securing of the fiber can then begin.

In step 1008, an epoxy is applied to the fiber in the block (see step 1202). The epoxy is then cured at a temperature of about 150° C. for approximately 1–15 minutes, or until cured (see step 1204). The block and fiber are then allowed to cool (see step 1208).

In the preferred embodiment, the epoxy comprises the resin diglycidylether bisphenol-A (such as Epon™828, manufactured by Shell Chemical Co., Houston, Tex.) and a curing agent based on 2-ethyl-4-methyl imidazole (such as Curamid™, manufactured by PolyOrganix Inc., Newburyport, Mass.) at a mix ratio of 100 parts resin to 10 parts curing agent. An equivalent commercially-available epoxy is Epoxy F-701 manufactured by Zymet Corp., East Hanover, N.J. Other epoxies of equal strength, viscosity prior to cure and hardness can be substituted.

Referring again to step 1010, the fiber and block are attached to the polishing arm of a disk polisher, such as a model 69–300 polisher manufactured by Buehler, Ltd., Lake Bluff, Ill. (as shown at step 1302). The polishing arm is set to a slow feed-rate, and light force is applied, as shown at step 1304. The stop position is then adjusted to a mark just pass where the substrate block hits the wheel to prevent excess polishing, as shown at step 1306.

Figure 14:
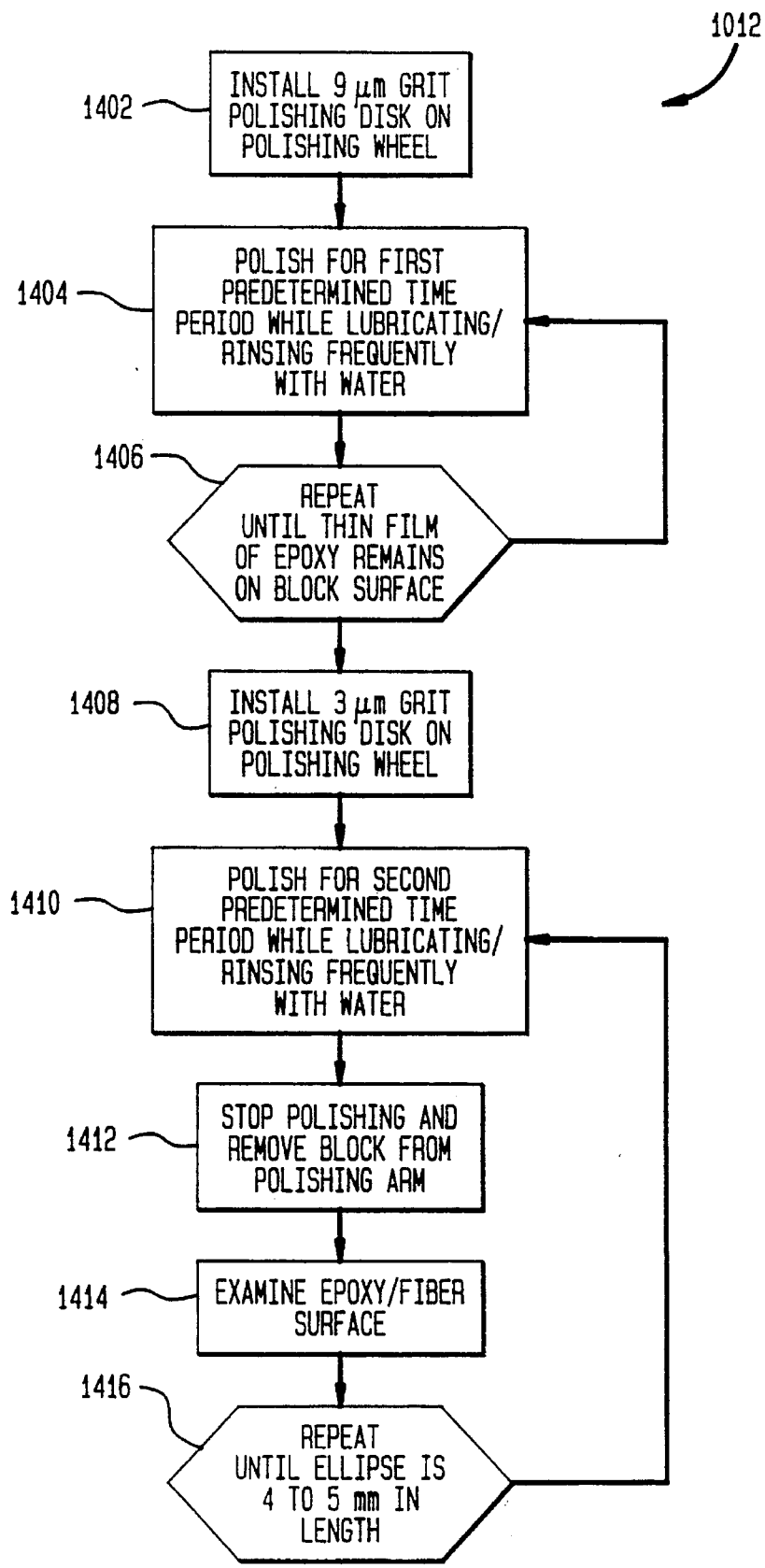

The coarse polishing step 1012 is shown in more detail in FIG. 14. Coarse polishing begins by installing a 9 µm grit polishing disk on the polishing wheel, as shown at step 1402. Polishing for a first predetermined time period is performed while lubricating/rinsing the polishing wheel frequently with water, as shown at step 1404. This polishing is repeated until only a thin film of epoxy remains on the block's surface, as shown at decisional block 1406. Next, a 3 µm grit-polishing disk is installed on a polishing wheel, as shown at step 1408. Polishing is then conducted for a second predetermined time period while lubricating/rinsing frequently with water, as shown at a step 1410. Polishing is then stopped (step 1412), and the epoxy/fiber surface carefully examined (see step 1414). This process of polishing and inspecting is repeated until the ellipse (formed by the polished surface of the fiber) is 4–5 mm in length, as shown at decisional block 1416.

Figure 15:
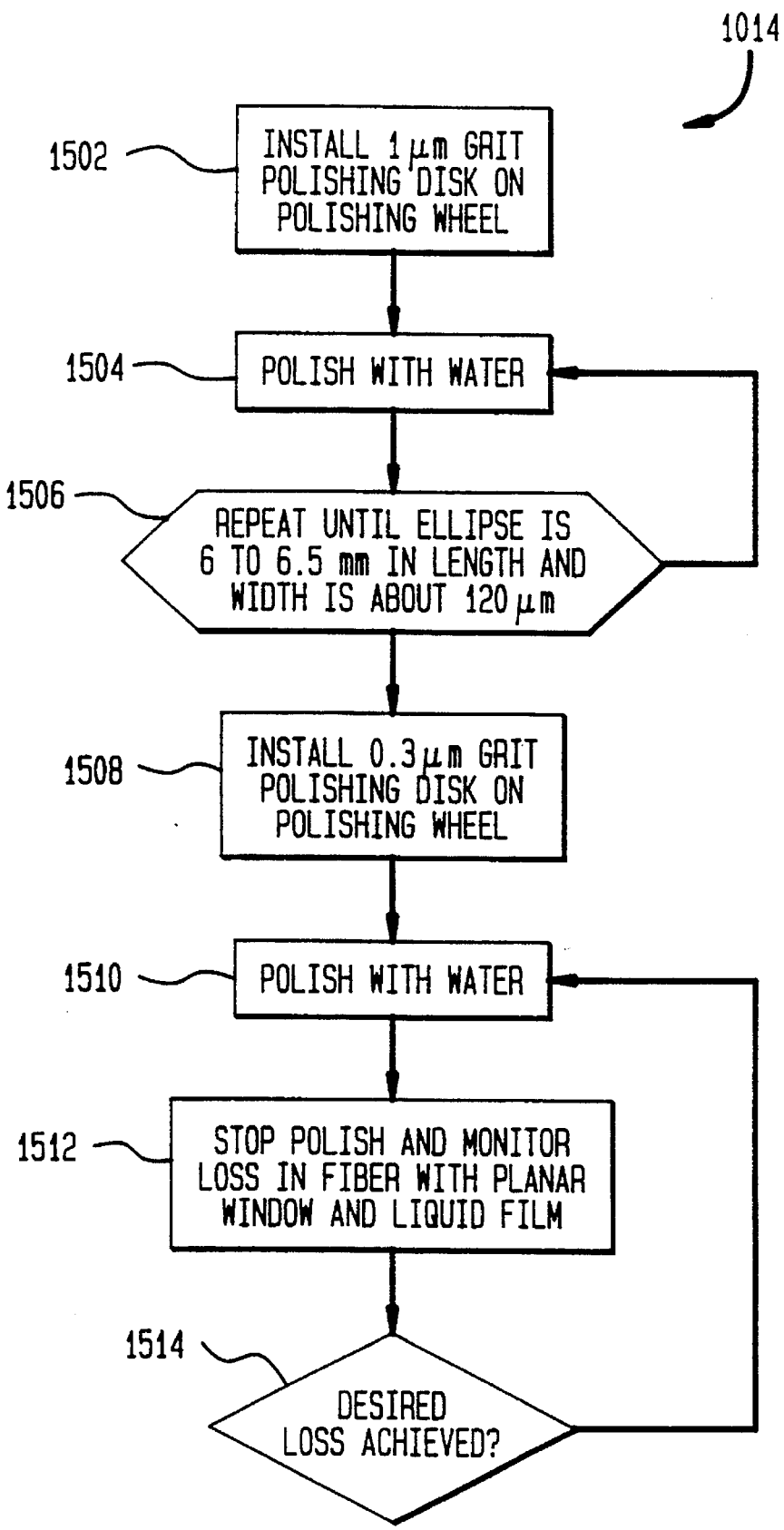

The fine polishing step 1014 is shown in more detail in FIG. 15. Fine polishing begins by installing a 1 µm grit polishing disk on the wheel and reattaching the block to the polishing arm, as shown at a step 1502. Polishing with water is repeated until the ellipse is approximately 6–6.5 mm in length and has a width of approximately 120 µm, as shown at steps 1504 and 1506. Polishing then continues with a 0.3 µm grit polishing disk on the polishing wheel, as shown at steps 1508 and 1510. Polishing is again stopped, so that loss in the system fiber can be measured with a planar window and liquid film, as shown at step 1512. This polishing and loss-monitoring process is continued until the desired loss is achieved, as shown at decisional block 1514.

Figure 17:
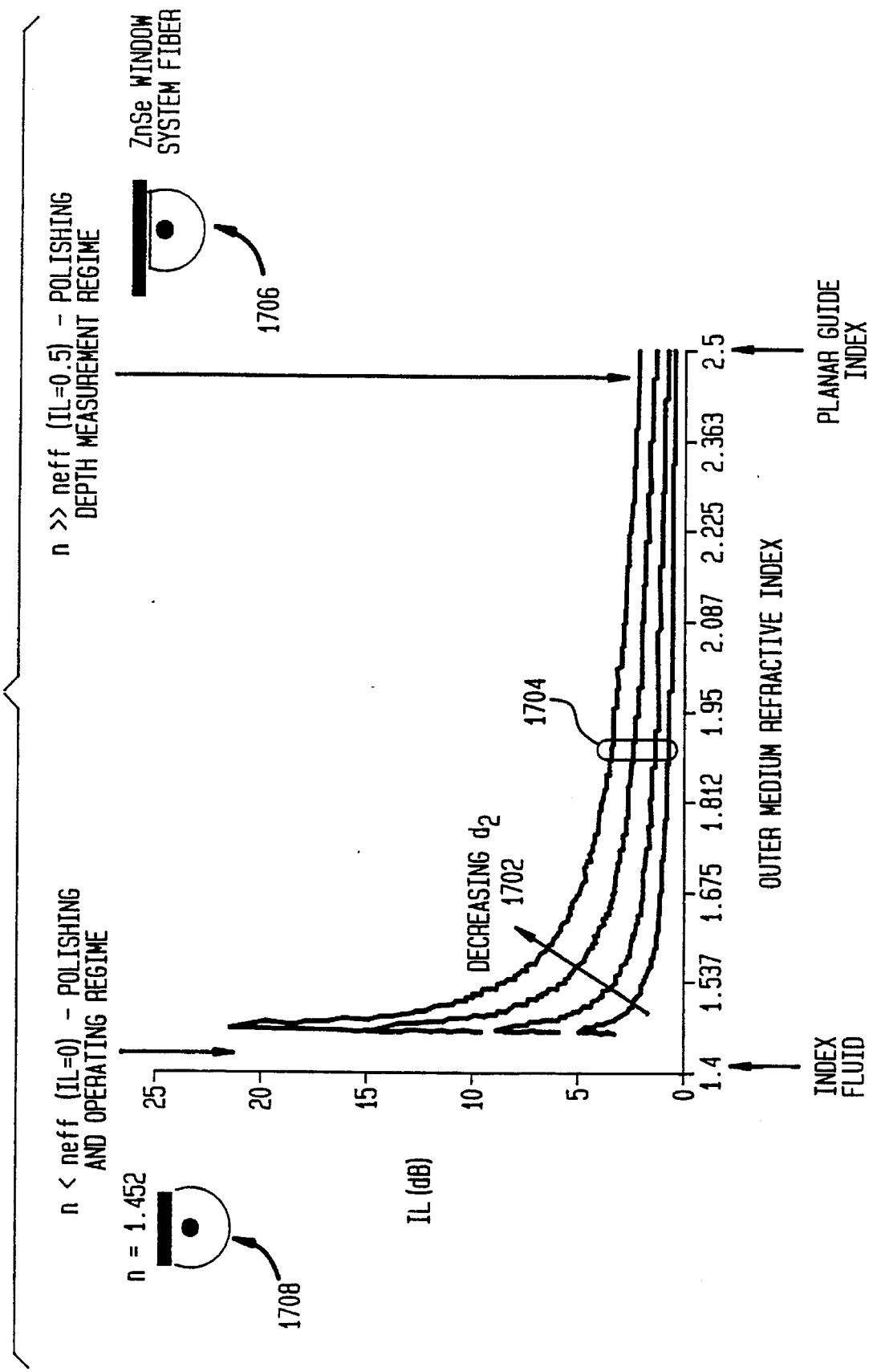
FIG. 17 shows a theoretical graph and explanation of the polishing process, according to the present invention.

FIG. 17 shows a graph of the polishing process. Induced loss is on the ordinate and outer medium reflective index is on the abscissa. The polishing and operating regime is shown on the far left region of the graph where the half coupler induced loss is zero. The polishing liquid was chosen with a refractive index of n=1.33 and the coupling liquid was chosen with a refractive index of n=1.452. The polish depth determination is shown in the far right region of the graph where the induced loss will be less than 0.5dB for the final desired polish depth and can be approached gradually.

Monitoring of the loss was done using a planar window (shown schematically at 1706) comprising zinc selenide (ZnSe) wetted with an index matching fluid (shown schematically at 1708). The planar guide's index of refraction is n=2.48. Arrows 1702 represent increasing polishing depth for the curve 1704.

Figure 18:
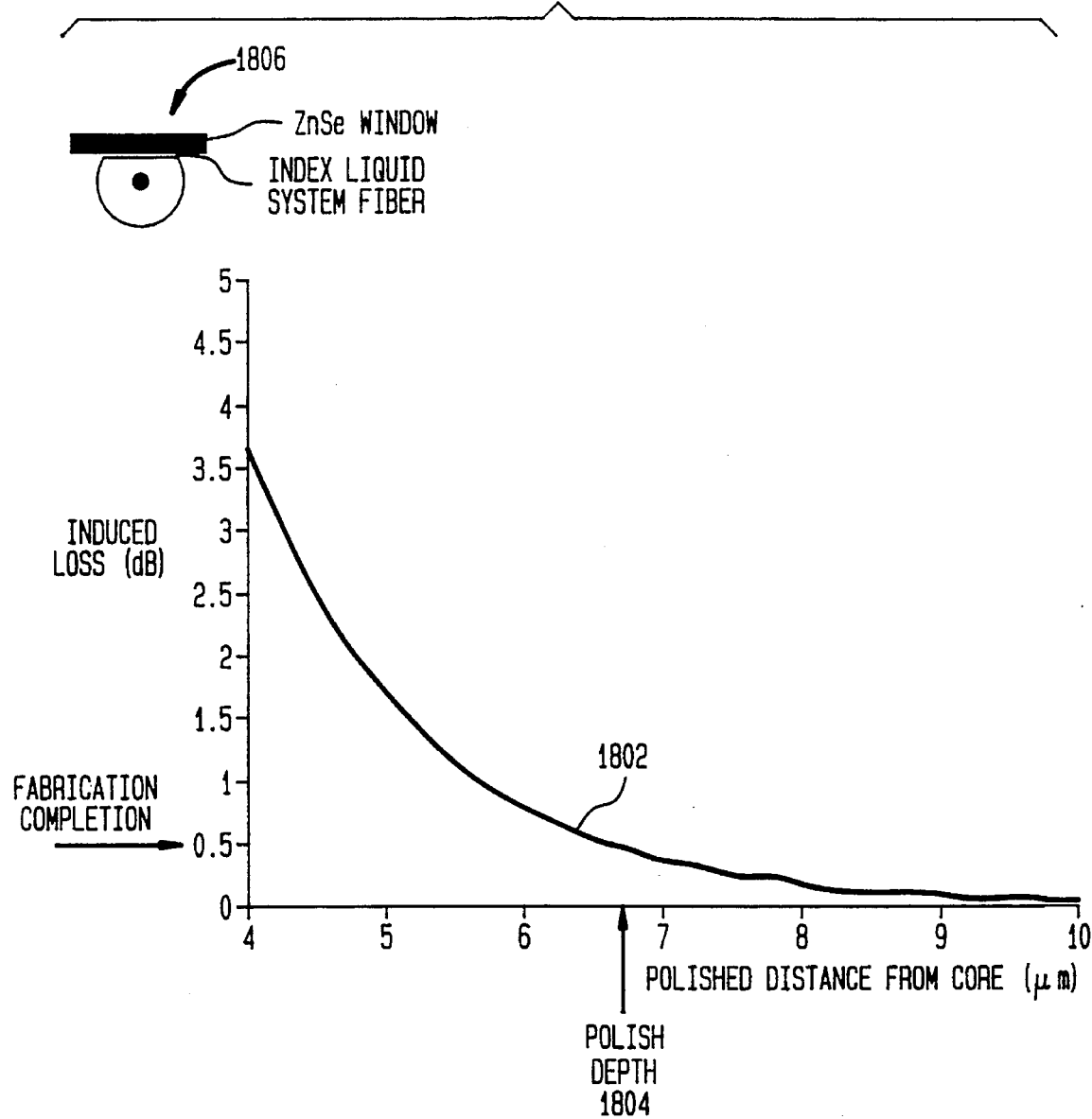
FIG. 18 is a theoretical graph showing polishing end point determination, according to the present invention.

The polishing and end point determination is shown in a graph in FIG. 18. Induced loss is on the ordinate and polish depth is on the abscissa. The induced loss (IL) is measured in dB, and the polished distance from the core is measured in µm. Curve 1802 shows that as the polish depth increases the induced loss will gradually increase and the polishing terminated when the IL≈0.5 dB. This yields the appropriate polish depth (1804). The planar window wetted with an index matching fluid are shown schematically at 1806.

The polish depth monitoring technique is a relatively fast method of achieving a desired polishing depth. The accuracy of the method is far superior to merely attempting to physically measure the size of the polished ellipse.

Figure 16:
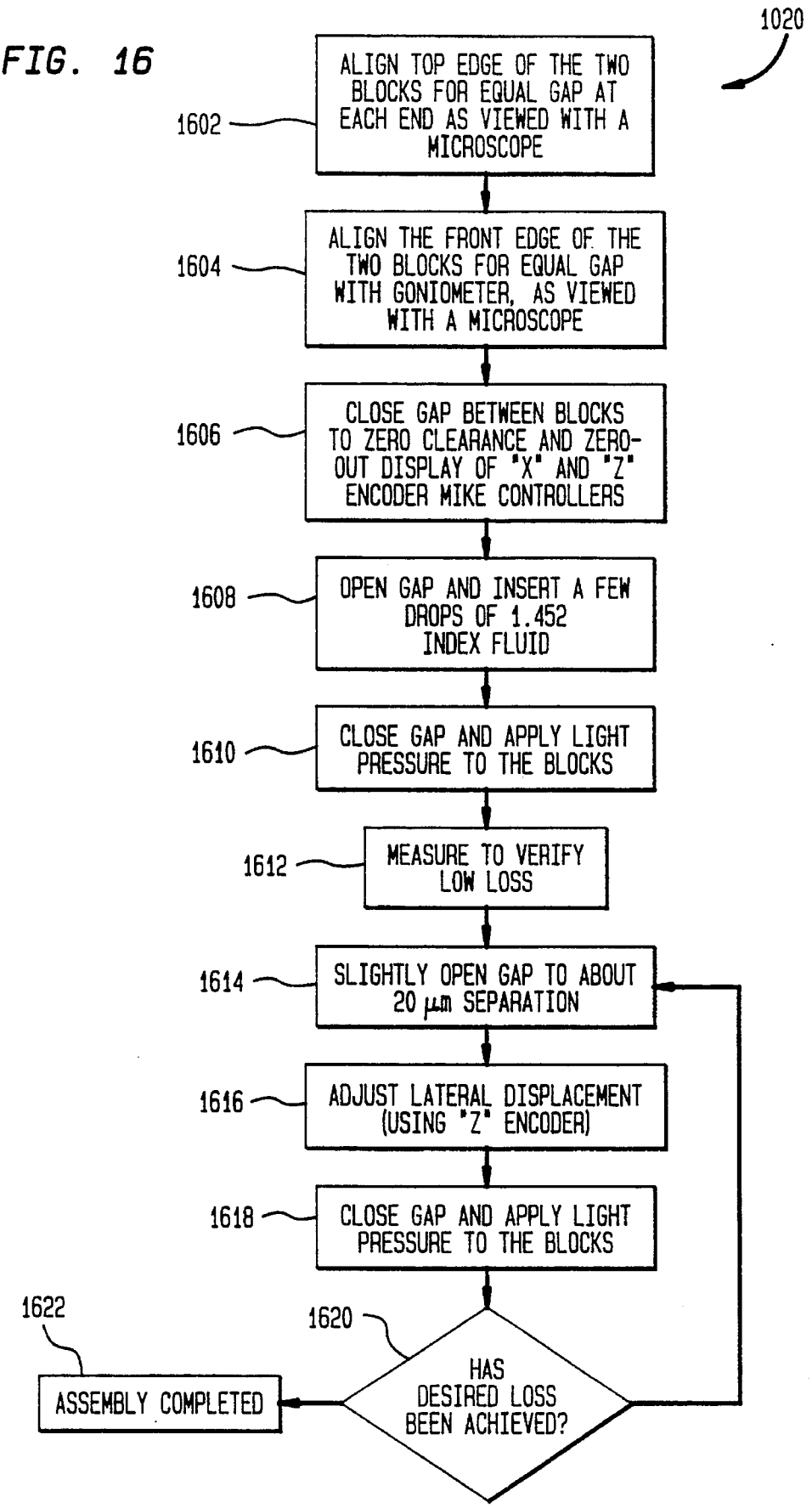

Turning again to final assembly of the coupler, further detail of the final alignment adjustment step 1020 is shown in FIG. 16. The top edges of the two blocks are aligned for equal gap at each end, using a goniometer (such as a Newport Klinger BG50 Goniometric Cradle), and a microscope, as shown generally at a step 1602. The front edges of the two blocks are aligned for equal gap width, using a second goniometer as shown at a step 1604. The gap between the blocks is then closed to zero clearance using the linear actuators, for example, as shown at step 1606. In the case of the encoder micropositioning controllers, their displays can be reset to zero at this stage. The gap between the blocks is then opened slightly to permit placement of a few drops of index fluid, as shown at step 1608. The gap is then closed, and a light pressure applied to the blocks, as shown at step 1610. Output of either fiber can then be measured to verify low loss, as shown at step 1612. This measurement technique would be apparent to a person skilled in the relevant art.

Final lateral adjustment then begins by slightly opening the gap to about 20 µm separation, as shown at a step 1614. A small lateral displacement (about 2 µm) adjustment is then made using the Z encoder micropositioning controller, as shown at step 1616. The gap between the blocks is then closed, and a light pressure applied, as shown at step 1618. Steps 1614, 1616 and 1618 are repeated until the desired loss ratio between the fibers is achieved, as shown at a decisional block 1620. At this point the assembly is complete, as shown step 1622.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for preparing optical fibers of an evanescent field coupler, comprising the steps of:
   a. forming a groove along a top surface of a substrate block, wherein said groove is formed shallower than the diameter of a stripped fiber;
   b. positioning an optical fiber in said groove, wherein a center portion of said optical fiber is stripped of its coating;
   c. gluing said optical fiber in said groove;
   d. polishing said optical fiber to remove a portion of its cladding to form a coupling region, without polishing said top surface of said substrate block;
   e. applying an optical signal to an end of said optical fiber;
   f. monitoring loss of said optical signal at said coupling region said loss being monitored at a location on said coupling region; and
   g. repeating steps d through f until a desired loss value is reached.

2. The method according to claim 1, wherein said monitoring step comprises the step of applying an index matching fluid to said coupling region and using a planar widow monitor said loss.

3. The method according to claim 2, wherein said monitoring step comprises the step of using a zinc selenium planar window.

4. The method according to claim 1, wherein said gluing step comprises the step of applying an epoxy comprising a diglycidylether bisphenol-A resin and a curing agent comprising 2-ethyl-4-methyl imidazole.

5. The method according to claim 4, further comprising the step of mixing at a ratio of 100 parts of said resin to 10 parts of said curing agent.

6. The method according to claim 4, further comprising the step of curing said epoxy at a temperature elevated above room temperature.

7. The method according to claim 6, wherein said epoxy is cured at a temperature of about 150° C. for approximately 1–15 minutes.

8. The method according to claim 1, wherein steps a-g are performed without shutting down subsystems and switching networks in an optical communication system that comprises said optical fiber because of excessive loss at said coupling region.

9. The method according to claim 1, wherein said polishing step comprises the steps of a coarse polishing step and a fine polishing step.

10. The method according to claim 9, wherein said coarse polishing step includes installing a 9 µm grit polishing disk on a polishing wheel and polishing said optical fiber for a first predetermined period of time and then installing a 3 µm grit polishing disk on the polishing wheel and polishing said optical fiber for a second predetermined period of time.

11. The method according to claim 9, wherein said fine polishing step includes installing a 1 µm grit polishing disk on a polishing wheel and polishing said optical fiber and then installing a 0.3 µm grit polishing disk on the polishing wheel and polishing said optical fiber.

12. The method according to claim 1, wherein said optical fiber is a system fiber carrying data in a first optical communication system that comprises a local area network.

13. The method according to claim 12, wherein said loss does not interrupt said data in said system fiber in said first optical communication system.

14. The method according to claim 12,
   wherein said coupling region in said system fiber in said first optical communication system is for connection to an additional optical fiber without said loss in said coupling region interrupting said data.

\* \* \* \* \*